Patented Feb. 27, 1923.

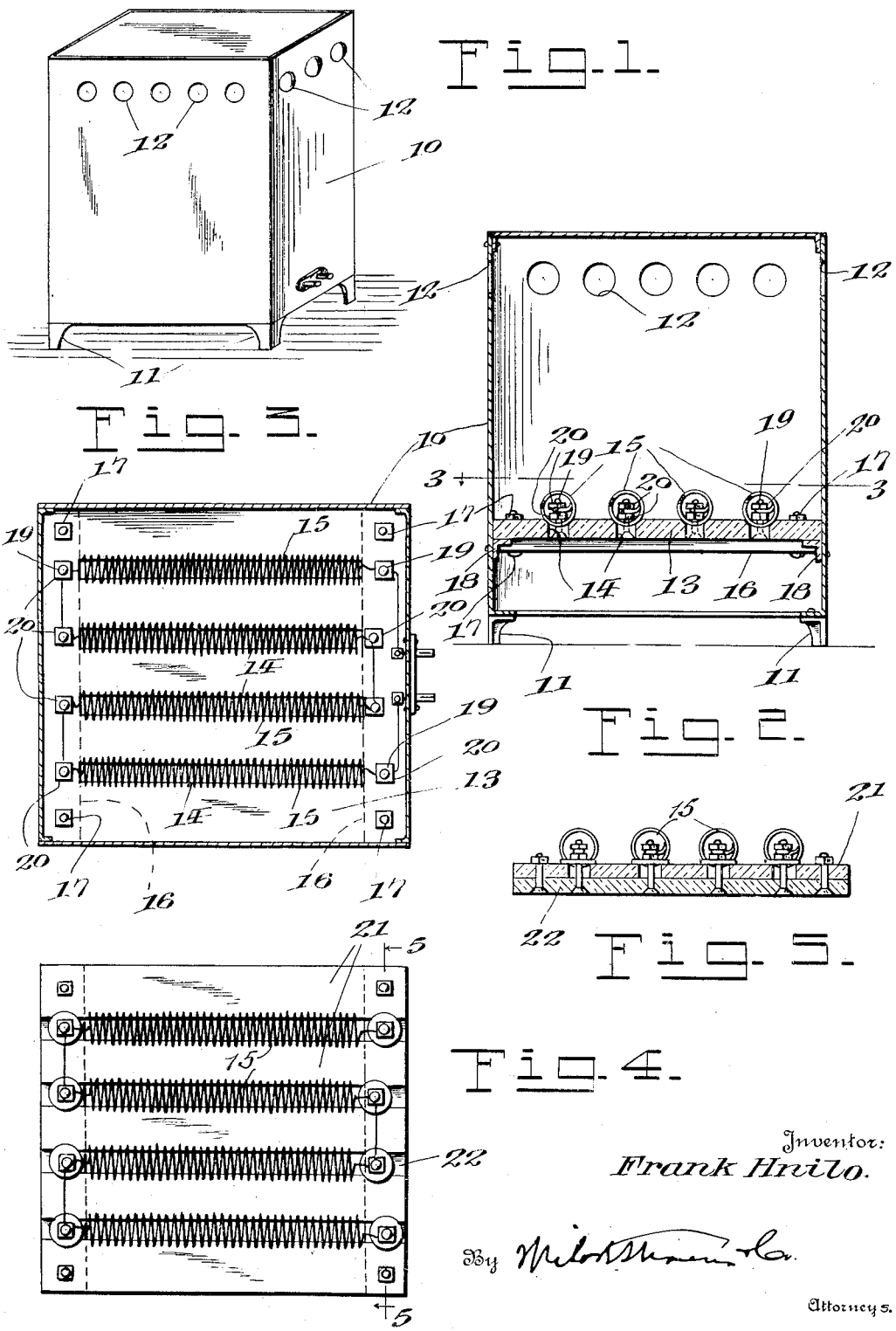

1,446,703

UNITED STATES PATENT OFFICE.

FRANK HNILO, OF CICERO, ILLINOIS, ASSIGNOR OF ONE-HALF TO JOHN SCHULTZ, OF CHICAGO, ILLINOIS.

ELECTRIC HEATER.

Application filed April 9, 1921. Serial No. 459,871.

*To all whom it may concern:*

Be it known that I, FRANK HNILO, a citizen of the United States, residing at Cicero, in the county of Cook and State of Illinois, have invented new and useful Improvements in Electric Heaters, of which the following is a specification.

This invention relates to electric heating apparatus, and more particularly to apparatus of this kind designed for heating air.

The invention has for its object to provide a very simple, inexpensive and efficient heater of the kind stated, and to this end it consists in a novel combination and arrangement of parts to be hereinafter described and claimed, reference being had to the accompanying drawing.

In the drawing,

Figure 1 is a perspective view of the heater;

Fig. 2 is a cross-section thereof;

Fig. 3 is a horizontal section on the line 3—3 of Fig. 2;

Fig. 4 is a plan view showing a modified form of heating unit, and

Fig. 5 is a cross-section on the line 5—5 of Fig. 4.

Referring specifically to the drawing 10 denotes the casing of the heater, the same being of rectangular or other desired contour, and provided at the bottom with legs 11 whereby it is seated on the floor or other supporting surface. The casing is closed at the top but open at the bottom, and as it is held spaced at the bottom from the supporting surface, the air can enter here. In the side, near the top thereof, are outlet openings 12 for the escape of the heated air.

A short distance above the open bottom of the casing 10 is a horizontal partition plate 13 having a number of spaced and parallel slots 14 extending completely through the plate from the top to the bottom thereof, and thus forming a passageway. Above each slot is mounted a helical resistance element 15.

The plate 13 may be made of porcelain or other non-conduction and fire-proof material, and on the bottom of the plate, at two opposite ends thereof are mounted cleats 16, said parts being fastened together by bolts 17. Two opposite side walls of the casing 10, on the interior thereof, have ledges 18 on which the plate 13 seats and is supported.

Adjacent to each end of each slot 14, the plate 13 carries a bolt 19 having its threaded end protruding from the top of the plate and fitted with two nuts 20. The bottom nut holds the bolt firmly to the plate, and the top nut is for the purpose of securing the resistance element in place.

The resistance element is a single piece of wire one end of which enters the casing 10 on one side and the other end leaves the casing on the same side, so that connection with a current source may be conveniently made. The coiled portions 15 of the wire are connected in a continuous series, the wire at the ends of each coil being straightened out for connection with the bolts 19 at the respective ends of the slots 14, and between adjacent bolts, the wire is also straight, and hence there is no heat set up in the wire at unnecessary places, the coiled portions of the wire being the sole active portions of the resistance element.

In operation, the heat from the resistance coils 15 heats the air in the casing 10 above the plate 13, and as the heated air expands and escapes from the casing through the top outlets 12, a draft is created through the slots 14 resulting in a flow of air through the slots, said air entering the casing at the open bottom thereof beneath the plate. The air passing through the slots comes in direct contact with the hot resistance coils and is thus heated, and as it passes upwardly in the casing it escapes therefrom through the outlets 12. It will therefore be seen that there is a constant circulation of air through the casing, cold air entering at the bottom and the heated air escaping at the top. The heat absorption from the resistance coils is uniform over their entire length, due to their horizontal position over the slots 14, and there is no obstruction to the circulation of air through the coils, the same passing freely between the convolutions. The slots deliver a comparatively small volume of air to the coils as their width is less than the diameter of the coils, resulting in a rapid heating action, the air expanding as it passes through the coils and into the open space above the same.

The apparatus is very inexpensive due to the simplicity of the few parts employed.

The resistance coils 15 lie close to the slots 14, the same being slightly flared at the top to provide seats for the coils.

Figs. 4 and 5 disclose a slight modification. Here, the partition is shown as made up of separate strips 21 which are secured in parallel and laterally spaced relation by cleats 22, the spacing resulting in the slot over which the resistance coils are arranged.

I claim:

A heating element for electric heaters comprising a plate of insulating material having slots to form air passageways therethrough, and resistance coils positioned above and in proximity to the slots, said coils having a diameter which is greater than the width of the slots to locate the coils partly within the slots and permit seating on the edges thereof, the major portion of the coils being outside the slots and above the plate.

In testimony whereof I affix my signature.

FRANK HNILO.